United States Patent [19]

Kazami

[11] Patent Number: 4,684,232
[45] Date of Patent: Aug. 4, 1987

[54] METHOD AND APPARATUS FOR CONTROLLING OPERATION OF CAMERA

[75] Inventor: Kazuyuki Kazami, Tokyo, Japan
[73] Assignee: Nippon Kogaku K. K., Tokyo, Japan
[21] Appl. No.: 841,619
[22] Filed: Mar. 20, 1986
[30] Foreign Application Priority Data
Mar. 26, 1985 [JP] Japan .................................. 60-61718
[51] Int. Cl.$^4$ ........................... G03B 3/00; G03B 7/00
[52] U.S. Cl. ..................................... 354/400; 354/412
[58] Field of Search ........................ 354/412, 400, 402
[56] References Cited

U.S. PATENT DOCUMENTS

| | | | |
|---|---|---|---|
| 4,295,715 | 10/1981 | Breen | 354/412 |
| 4,345,825 | 8/1982 | Matteson et al. | 354/412 |
| 4,361,387 | 11/1982 | Cloutier | 354/412 |
| 4,437,743 | 3/1984 | Sakai et al. | 354/412 |
| 4,458,996 | 7/1984 | Harigaya et al. | 354/412 |
| 4,482,236 | 11/1984 | Tsuzuki et al. | 354/412 |
| 4,492,450 | 1/1985 | Watanabe et al. | 354/412 |
| 4,547,056 | 10/1985 | Baumeister | 354/412 |
| 4,607,931 | 8/1986 | Aihara | 354/412 |

*Primary Examiner*—Russell E. Adams
*Attorney, Agent, or Firm*—Shapiro and Shapiro

[57] ABSTRACT

A method and apparatus for controlling an operation of a camera is so structured that when a first process for performing a pre-focusing process and the like and a third process for performing light-metering process, exposure control process and the like after auto-focus control are executed under the program control of a microcomputer, and a second process for performing the auto-focus control is executed between the first and third processes, the operation of the microcomputer is interrupted by cutting off power supply thereto or applying an operation stop signal to a reset terminal thereof after the first process, and the second process is then executed. After second process is completed, the microcomputer is restarted and, after it discriminates the completion of the second process, the third process is executed. In this way, since the first and third processes based on the program control are executed in a time-serial manner, they are no longer adversely influenced by the second process. Furthermore, when the microcomputer is restarted, the third process is executed after it discriminates the completion of the second process. Therefore, even if the program control is interrupted, the computer program control sequence can be executed.

12 Claims, 4 Drawing Figures

METHOD AND APPARATUS FOR CONTROLLING OPERATION OF CAMERA

BACKGROUND OF THE INVENTION

1. Field of the Invention

The present invention relates to operation control for a camera comprising a program control means consisting of a microcomputer.

2. Related Background Art

Recent cameras comprise microcomputer to perform an automatic light-metering or exposure process under the program control, as well as an auto-focus process by interlocking an auto-focus device with a motor for moving an imaging lens. Thus, automatic focusing is performed to always provide optimal imaging conditions.

The following process of an automatic camera are sequentially performed under the program control of a microcomputer upon depression of a shutter release button: a battery check process for checking a dry-cell voltage; a light-metering process for checking an apertures; a low-luminance process for determining, from luminance of an object, if auxiliary illumination (e.g., a flash device) is necessary, and if necessary, for signaling for the use of the flash device; and a discrimination process for checking if the flash device is used. Next, a focusing process is performed by an auto-focus device. After the focusing process is completed, an exposure control process is performed under the control of the microcomputer. In this way, program control of a microcomputer plays an increasingly important role in modern camera function.

However, the following problems are presented.

When the auto-focus device is operated, a motor is driven to move an imaging lens. If this operation is performed during the operation of the microcomputer, the microcomputer is adversely influenced by noise produced by the motor or variations in power source voltage due to current load, and is erroneously operated, thus interrupting normal operation control of the camera.

In order to overcome this, a control mechanism which produces noise and the microcomputer can be time-divisionally operated. For example, during the auto-focus operation, power supply to the microcomputer is cut off or an operation interruption signal is applied thereto to interrupt its operation. During this interruption, the motor or the like is operated, and after the auto-focus operation is completed, the microcomputer is again energized.

However, when the microcomputer is restarted after cutting off the power supply or resetting thereof, the program control starts again from an initial program step. As a result, only the portion of the computer program processed before the microcomputer power supply was interrupted is executed, and an imaging process based on the remaining portion of the program cannot be executed.

For example, when the microcomputer is enabled upon depression of a shutter release button, a pre-focusing process (e.g., battery check, luminance determination, and the like) is executed, and a focusing operation is then performed by the auto-focus device while disabling the microcomputer. After the focusing operation is completed, the microcomputer is again enabled. In this case, program control to be performed after the focusing operation (to be referred to as an after-focusing process hereinafter) cannot be executed. In other words, if the focusing operation is to be executed between the pre-focusing and after-focusing processes under the program control of the microcomputer, the latter cannot be performed.

Note that the pre-focusing process can be combined with the control steps of the after-focusing process, and after the auto-focus operation is completed, only the program control of the microcomputer need be performed, thus eliminating the adverse influence on the microcomputer. However, if focusing must be adjusted upon the use of the flash device the microcomputer must determine before the auto-focus operation if the flash device is to be used and set various data therefor. In order to control the operation of such a complicated camera, the processes of the microcomputer are inherently mixed with the those of other mechanisms.

SUMMARY OF THE INVENTION

The present invention has been made in consideration of the above situation and has as its object to provide a method and apparatus for controlling an operation of a camera in which a microcomputer is not erroneously operated, even if another control mechanism is operated during the program control of the microcomputer, and the operation of the microcomputer can be interrupted by cutting off power supply thereto or resetting the microcomputer so as to prevent an adverse influence from another control mechanism being operated, thus allowing a sequential process wherein a sequence of program control after the microcomputer is interrupted can be executed.

In order to achieve the object of the present invention, when a first process for performing a pre-focusing process and the like and a third process for performing light-metering process, exposure control process and the like after auto-focus control are executed under the program control of a microcomputer, and a second process for performing the auto-focus control is executed between the first and third processes, the operation of the microcomputer is interrupted by cutting off power supply thereto or applying an operation stop signal to a reset terminal thereof after the first process, and the second process is then executed. After the second process is completed, the microcomputer is restarted and, after it discriminates the completion of the second process, the third process is executed. In this way, since the first and third processes based on the program control are executed in a time-serial manner, they are no longer adversely influenced by the second process. Furthermore, when the microcomputer is restarted, the third process is executed after it discriminates the completion of the second process. Therefore, even if the program control is interrupted, the computer program control sequence can be executed.

DESCRIPTION OF THE PREFERRED EMBODIMENTS

Figure 1:
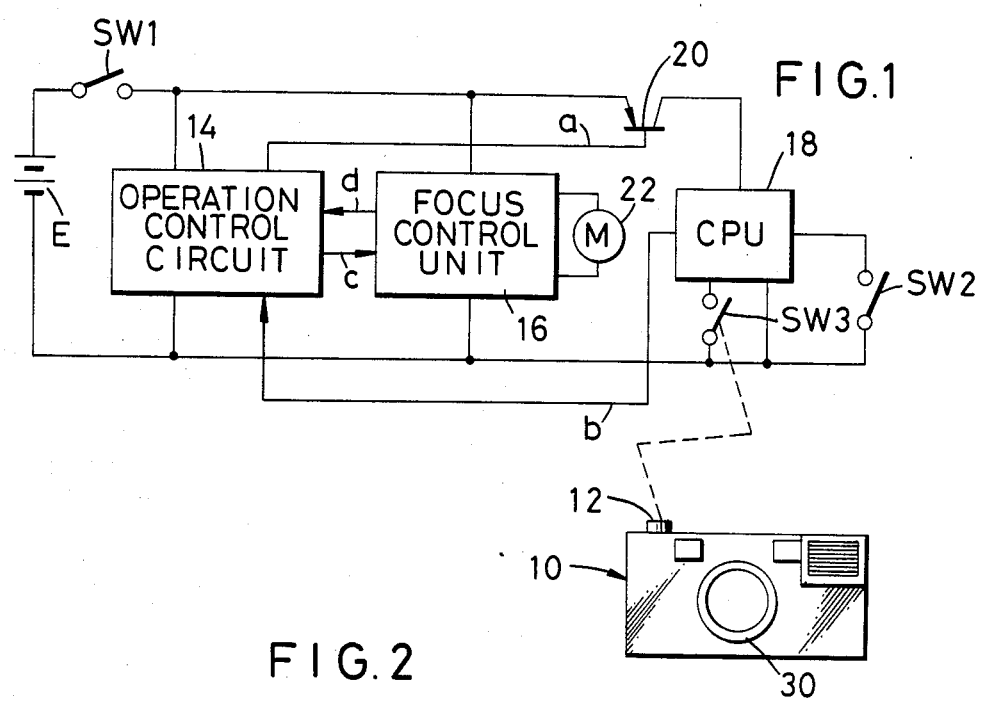
FIG. 1 is a circuit diagram of an operation processing apparatus of the present invention installed in a camera.

FIG. 1 shows a circuit configuration of an operation control apparatus installed in a camera 10. When a shutter release button 12 is depressed with a first stroke, a power source switch SW1 is turned on and a power source E supplies power to an operation control circuit 14 and a focus control unit 16.

A microcomputer (CPU) 18 is powered when a PNP transistor 20 is enabled, which is controlled by a bease signal from the operation control circuit 14. An input port of the microcomputer 18 is connected to a detection switch SW2 which is turned on upon detection of completion of the focusing operation of the unit 16, and to a release switch SW3 which is turned on by depressing the button 12 with a second stroke (longer than the first stroke).

A control signal line b connects the microcomputer 18 and the operation control circuit 14, and control signal lines c and d connect the circuit 14 and the unit 16.

Figure 2:
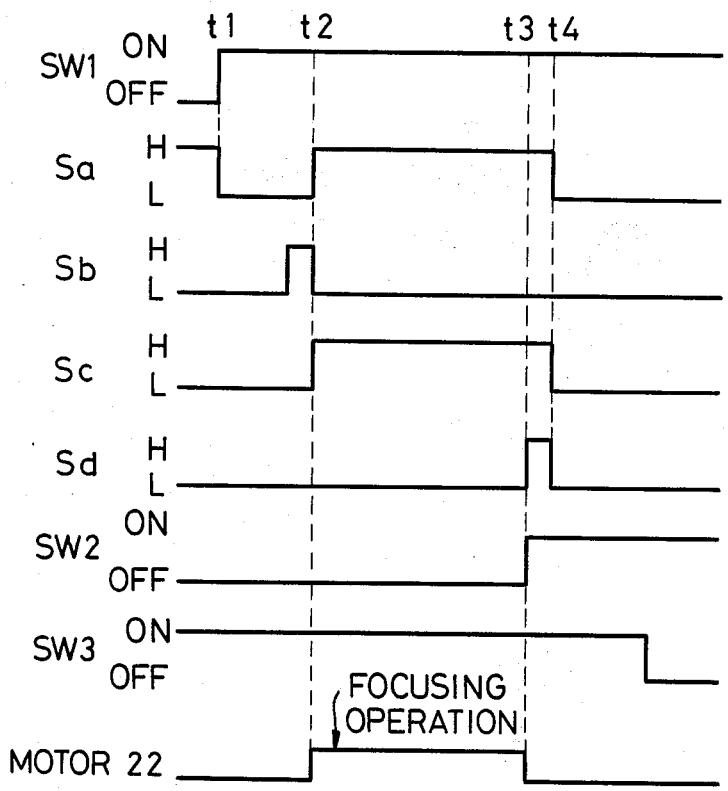
FIG. 2 is a timing chart showing an operation of the apparatus shown in FIG. 1.
Figure 3:
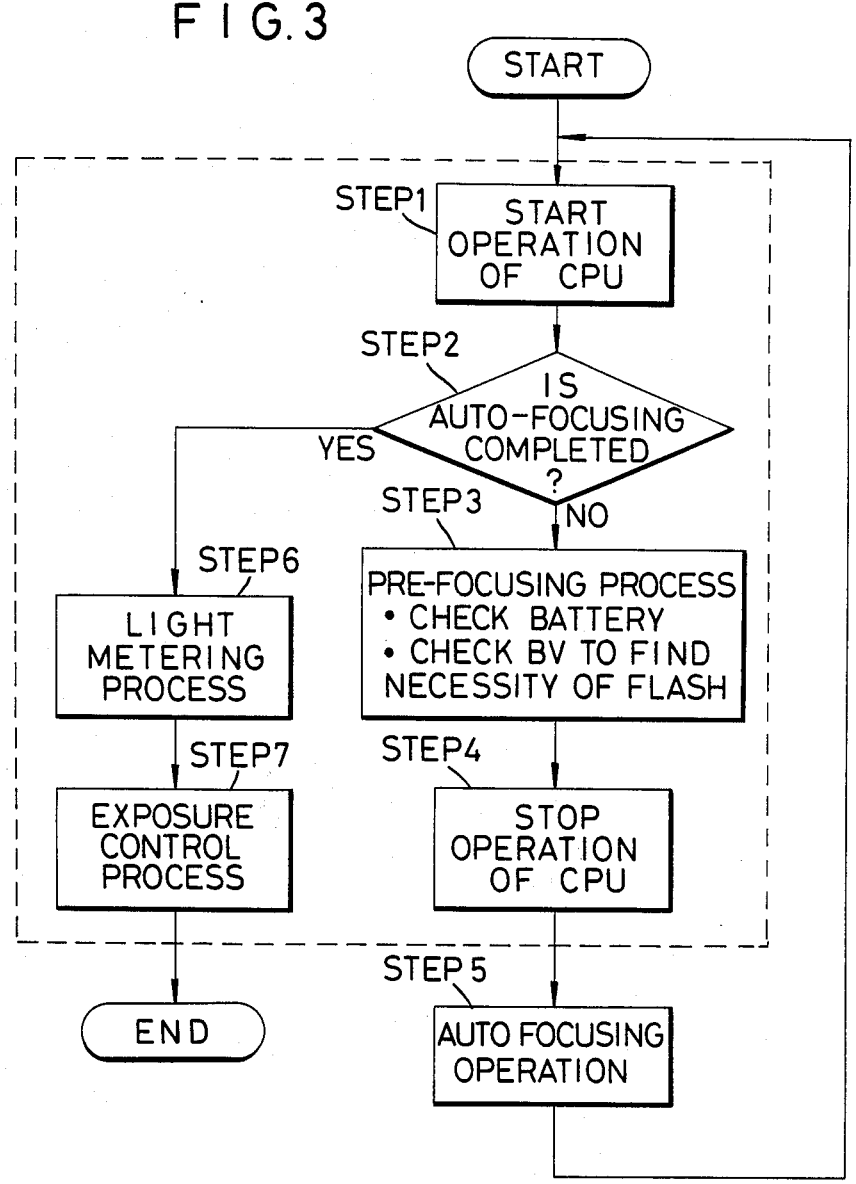
FIG. 3 is a flow chart showing a program sequence of the apparatus shown in FIG. 1.

FIG. 3 is a flow chart showing the operation of the circuit in FIG. 1. In this flow chart, respective steps within the dotted lines are processed under the program control of the microcomputer 18. FIG. 2 is a timing chart showing respective control signals output onto the signal lines a, b, c, and d of FIG. 1, the open/close states of the switches SW1, SW2, and SW3, and an energized state of a focus drive motor 22 controlled by the unit 16.

The operation of this circuit will now be described with reference to FIGS. 1 to 3.

When the button 12 is depressed with the first stroke to turn on the switch SW1, the operation control circuit 14 and the focus control unit 16 are energized, and a LOW level signals Sa is supplied to the base terminal of the transistor 20 from the operation control circuit 14 through the control signal line a, thus enabling the transistor 20 to energize the microcomputer 18. A CPU of the microcomputer 18 is thus rendered operative (time $t_1$ in FIG. 2, STEP 1 in FIG. 3).

Subsequently, the CPU 18 determines in STEP 2 if the auto-focus control is completed. At this time, since the auto-focus control is not completed, the flow advances to STEP 3, and the CPU 18 executes a pre-focusing process including a battery check process, a luminance determination process and the like. After the pre-focusing processing is completed, a signal Sb is supplied from the CPU 18 to the operation control circuit 14 through the control signal line b.

Upon reception of the signal Sb, the circuit 14 produces a HIGH level signal Sa onto the control signal line a to disable the transistor 20, thereby stopping the operation of the microcomputer 18. Furthermore, the circuit 14 supplies a signal Sc for instructing start of the auto-focus control to the focus control unit 16 through the control signal line c (time $t_2$ in FIG. 2, STEP 4 in FIG. 3).

Upon reception of the signal Sc, the unit 16 executes the auto-focus operation shown in STEP 5. More specifically, the motor 22 drives an imaging lens 30 located at its innermost position in the camera housing toward an object, and stops it at an in-focus position with respect to the object, thus completing the auto-focus operation.

After completion of the auto-focus operation, the unit 16 supplies a signal Sd to the circuit 14 through the control signal line d. The switch SW2 is closed, and a LOW level signal is supplied to the input port of the CPU. The circuit 14 produces the LOW level signal Sa onto the control signal line a to enable the transistor 30. Thus, the microcomputer 18 is restarted by a power-on-reset circuit (not shown) at time $t_4$ in FIG. 2.

Therefore, the CPU 18 resumes the program control from STEP 1, and checks in STEP 2 if the auto-focus control is completed. The CPU 18 detects that the switch SW2 is turned on, and discriminates that the auto-focus control is completed. This time, since the auto-focus control is completed and the release switch SW3 is turned on, the CPU 18 executes STEPs 6 and 7 in accordance with the program control, thus executing the light-metering and exposure control processes.

To summarize the operation of this embodiment, the pre-focusing processing as a first process by the program control is executed, and auto-focus control as a second process independent of the microcomputer is then executed. Next, the light-metering and exposure control processes as a third process by the program control of the CPU are executed. Note that the auto-focus control can be shifted to the light-metering and exposure control processes through a discrimination routine (STEP 2) of the microcomputer.

It should be noted that the pre-focusing process as the first process can be performed before the discrimination routine.

In this embodiment, an encoder for detecting, e.g., a moving position of the imaging lens can serve as the detection switch SW2 for detecting the completion of the auto-focus control.

Figure 4:
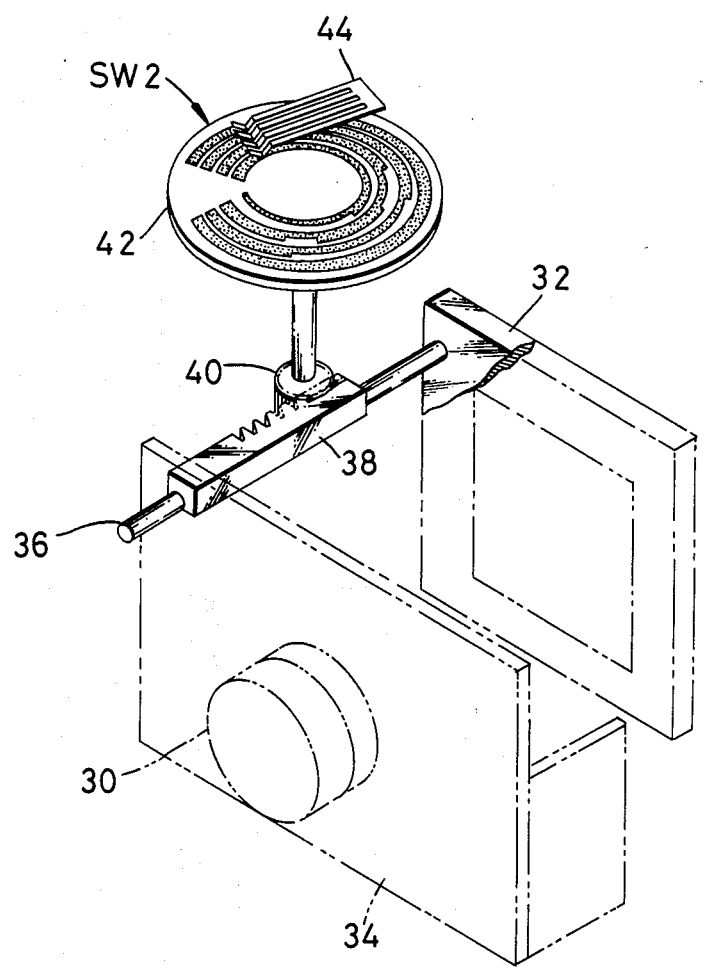
FIG. 4 is a perspective view of an imaging lens and an encoder.

FIG. 4 shows an arrangement of the imaging lens and an encoder in the focus control unit 16. A base plate 34 on which the imaging lens 30 is arranged is supported by a guide shaft 36 fixed to a housing 32 so as to be movable along its optical axis. The imaging lens 30 is moved together with the plate 34 by a drive motor (not shown) along the axial direction, and the amount of movement is transmitted to an encoder base 42 through a rack 38 and a pinion 40 fixed to the base plate 34. When a brush 44 slides along an encoding pattern upon rotation of the encoder base 42, a moving position of the imaging lens 30 can be detected between the brush 44 and the encoding pattern.

While the shutter release button 12 is not depressed, the imaging lens 30 is located at a start position nearest the housing 32. When the shutter release button 12 is depressed with the first stroke, the lens 30 is moved from the start position to a position focusing on infinity, is then moved toward a closest focusing distance position, and is stopped at an in-focus position for an object by a known lens stop device. After a photographic operation, the lens 30 is returned to the start position, thus preparing for the next photographic operation.

Therefore, if the auto-focus control is not completed, the imaging lens 30 is not at the start position but between the closest focusing distance position and the infinity position. Thus, the switch SW2 in FIG. 1 can be arranged to detect this position based on a detection signal from the encoder.

What I claimed is:

1. In a camera having first and third processing devices controlled in accordance with a program of a computer, and having a second processing device controlled independently of the program of said computer, a method for sequentially executing the operation of the first, second, and third processing devices, comprising the steps of:

(a) enabling said computer;

(b) discriminating completion of the operation of said second processing device by said computer;

(c) when it is discriminated that the operation of said second processing device is not completed, disabling said computer after the operation of said first processing device is completed, and resuming operation of said computer after the operation of said second processing device is completed; and (d) when it is discriminated that the operation of said second processing device is completed, executing the operation of said third processing device in accordance with the program of said computer.

2. A method according to claim 1, wherein said second processing device includes focus control means having focusing means, an imaging lens and drive means for moving said imaging lens in accordance with said focusing means.

3. A method according to claim 2, wherein said second processing device further includes encoder means for, when said imaging lens is moved from its initial position, producing an output corresponding to a moving position of said imaging lens, and the completion of the operation of said second processing device is discriminated from the output from said encoder means.

4. A method according to claim 1, wherein the step of disabling said computer is accomplished by cutting off power supply to said computer.

5. A method according to claim 1, wherein the step of disabling said computer is accomplished by applying a reset signal to a reset terminal of said computer.

6. In a camera having first and third processing devices controlled in accordance with a program of a computer, and having a second processing device controlled independently of the program of said computer, a method for sequentially executing the operation of the first, second, and third processing devices, comprising the steps of:

(a) enabling said computer;

(b) checking by said computer if the operation of said second processing device is completed;

(c) disabling said computer when it is determined that the operation of said second processing device is not completed;

(d) executing the operation of said first processing device in accordance with the program of said computer between the step of enabling said computer and the step of disabling it;

(e) resuming operation of said computer when the operation of said second processing device is completed after the step of disabling said computer; and (f) executing the operation of said third processing device in accordance with the program of said computer when it is discriminated that the operation of said second processing device is completed.

7. In a camera having first, second, and third processing devices, an apparatus for sequentially executing the operation of said first, second, and third processing devices comprising:

computer means having a program for controlling said first and third processing devices, and having another program for executing the operation of said third processing device when completion of said second processing device is detected;

completion detection means for detecting the completion of the operation of said second processing device and supplying a detection signal to said computer means; and means for controlling said computer means and said second processing device, said control means disabling said computer means in response to the completion of the operation of said first processing device, initiating the operation of said second processing device, and disabling said computer means in response to the completion of the operation of said second processing device.

8. An apparatus according to claim 7, wherein said computer means discriminates the completion of the operation of said second processing device in response to the detection signal from said completion detection means.

9. An apparatus according to claim 7, wherein said computer means has a program for executing the operation of said third processing device upon reception of the detection signal from said completion detection means, and for executing the operation of said first processing device when no detection signal is received.

10. An apparatus according to claim 7, wherein said second processing device includes means for detecting a focusing state of an imaging lens with respect to an object, and drive means for moving said imaging lens for focusing.

11. An apparatus according to claim 10, wherein said completion detection means includes encoder means for, when said imaging lens is moved from its initial position, producing an output corresponding to a moved position of said imaging lens, the detection signal corresponding with the output from said encoder means.

12. An apparatus according to claim 7, wherein said control means includes circuit means for controlling power supply to said computer means.

* * * * *